United States Patent

Sumi

Patent Number: 5,191,439
Date of Patent: Mar. 2, 1993

[54] IMAGE SIGNAL PROCESSING APPARATUS

[75] Inventor: Katsuto Sumi, Kanagawa, Japan

[73] Assignee: Fuji Photo Film Co., Ltd., Kanagawa, Japan

[21] Appl. No.: 603,062

[22] Filed: Oct. 25, 1990

[30] Foreign Application Priority Data

Oct. 27, 1989 [JP] Japan .................. 1-281486
Oct. 27, 1989 [JP] Japan .................. 1-281487

[51] Int. Cl.$^5$ .............................................. H04N 1/40
[52] U.S. Cl. .................................................. 358/447
[58] Field of Search ................ 382/31; 358/447–448, 358/454, 452, 458, 461, 455

[56] References Cited

U.S. PATENT DOCUMENTS

| 4,591,923 | 5/1986 | Urabe et al. | |
| 4,903,123 | 2/1990 | Kawamura et al. | 358/454 |
| 4,972,256 | 11/1990 | Hirosawa et al. | 358/447 |
| 5,001,573 | 3/1991 | Sakamoto et al. | 358/447 |
| 5,050,223 | 9/1991 | Sumi | 358/447 |
| 5,051,842 | 9/1991 | Shimazaki | 358/447 |
| 5,107,346 | 4/1992 | Bowers et al. | 358/447 |

FOREIGN PATENT DOCUMENTS

| 0202427 | 11/1986 | European Pat. Off. . |
| 0225027 | 6/1987 | European Pat. Off. . |
| 2134352 | 8/1984 | United Kingdom . |

Primary Examiner—Stephen Brinich
Attorney, Agent, or Firm—Sughrue, Mion, Zinn, Macpeak & Seas

[57] ABSTRACT

An image scanning reading system incorporates an image signal processing device for processing an image signal produced by a reading optical system. The image signal processing device includes an unsharp signal generator for averaging image signals S produced when image information on an original is scanned by the reading optical system, thereby to produce an unsharp signal U. The image signal processing device also includes an image signal generator for generating an image signal S' from the image signals S and the unsharp signal U according to the equation:

$$S' = S + K(x) \cdot (S - U)$$

where $K(x)$ is a corrective coefficient selected to compensate for variations of MTF characteristics of the image signals, which variations are caused with respect to scanned positions x on the original by the reading optical system.

3 Claims, 14 Drawing Sheets

IMAGE SIGNAL PROCESSING APPARATUS

BACKGROUND OF THE INVENTION

The present invention relates to an image signal processing device for correcting irregularities or degradation of MTF characteristics of an image signal due to a reading optical system, using an image sharpness emphasizing process.

There is known an image scanning reading system in which image information of an original or copy is scanned with a reading optical system to produce an image signal representing the image information.

FIG. 1 of the accompanying drawings shows such an image scanning reading system in which image information carried on an original or copy A is scanned in a main scanning direction indicated by the arrow X with two line sensors 2, 4 while the original A is being fed in an auxiliary scanning direction indicated by the arrow Y. Light reflected from the original A between scanned positions $a_1$, $a_2$ along a main scanning line 6 is guided by a fully reflecting mirror 8 and a lens 10 to the line sensor 4, by which the light is converted into an electric signal. Light reflected from the original A between scanned positions $a_2$, $a_3$ along the main scanning line 6 is guided through the fully reflecting mirror 8, the lens 10, and a fully reflecting mirror 12 to the line sensor 2, by which the light is converted into an electric signal. The electric signals produced by the line sensors 2, 4 are combined into an electric signal which corresponds to the image information borne by the original A between the scanned positions $a_1$, $a_3$ along the main scanning line 6.

The image scanning reading system has the problem of MTF (Modulation Transfer Function) irregularities of an image signal due to the reading optical system which includes the fully reflecting mirror 8, the lens 10, the fully reflecting mirror 12, and the line sensors 2, 4.

For example, as shown in FIG. 2, the MTF characteristics are degraded in the vicinity of an area where the line sensors 2, 4 are optically joined, the area corresponding to the scanned position $a_2$ on the original A. This MTF degradation is caused by the fact that the opening of the lens 10 as viewed from the line sensor 4 is vignetted by the fully reflecting mirror 12, as shown in FIG. 3. As a result, the MTF characteristics are degraded in the area where the line sensors 2, 4 are optically joined.

The MTF irregularities with respect to the scanned position x are also caused by different characteristics of the line sensors 2, 4 or the angle of view (or the image height) of the lens 10.

With the MTF characteristics of the image signal being rendered irregular due to the reading optical system, when a striped highlight image as shown in FIG. 4(a) is read by the line sensors 2, 4 which are optically overlapped as shown in FIG. 4(b), the line sensors 2, 4 produce an image signal as shown in FIG. 4(c). If a slicer level 14 is selected with respect to the image signal as shown in FIG. 4(c), then an image reproduced from the generated image signal looks as shown in FIG. 4(d). When a striped shadow image as shown in FIG. 5(a) is read by the optically overlapped line sensors 2, 4 as shown in FIG. 5(b), the line sensors 2, 4 produce an image signal as shown in FIG. 5(c). When a slicer level 14 as shown in FIG. 5(c) is used with respect to the image signal, a reproduced image looks as shown in FIG. 5(d).

The MTF irregularities as described above bring about density irregularities in reproduced images when image signals are processed. When a continuous-tone image is read from the original A and converted into a halftone-dot image, not only image density irregularities are produced, but also the sharpness of the image is made irregular due to the MTF irregularities.

It is known that the MTF irregularities depend on not only the scanned position x on the original A, but also the scanning direction as shown in FIG. 6. Specifically, the MTF characteristics vary between the main scanning direction indicated by the arrow X and the auxiliary scanning direction indicated by the arrow Y. Accordingly, the sharpness of the reproduced image varies depending on the scanning direction.

The image signal produced by the image scanning reading system also suffers a problem in that the MTF characteristics are degraded as the spatial frequency of the digitized image goes higher. If the MTF characteristics are degraded depending on the spatial frequency of the digitized image, then the sharpness of the reproduced image is also degraded.

In order to compensate for such degradation of the image sharpness, there has been proposed a signal processing system for effecting a sharpness emphasizing process on an image signal.

However, since the MTF characteristics are degraded as the spatial frequency of the applied digitized image, it is highly difficult and requires a highly complex signal processing system to carry out sharpness emphasis over a wide range of spatial frequencies.

SUMMARY OF THE INVENTION

It is a main object of the present invention to provide an image signal processing device which can correct irregularities or degradation of MTF characteristics to produce an optimum image signal.

Another object of the present invention is to provide an image signal processing device capable of producing an image which is free of density irregularities and has uniform sharpness, based on an image signal having uniform MTF characteristics.

Still another object of the present invention is to provide an image signal processing device which is relatively simple in arrangement.

According to the present invention, there is provided an image signal processing device for processing an image signal produced by a reading optical system, comprising unsharp signal generating means for averaging image signals S produced when image information on an original is scanned by the reading optical system, thereby to produce an unsharp signal U, and image signal generating means for generating an image signal S′ from the image signals S and the unsharp signal U according to the equation:

$$S' = S + K(x) \cdot (S - U)$$

where K(x) is a corrective coefficient selected to compensate for variations of MTF characteristics of the image signals, which variations are caused with respect to scanned positions x on the original by the reading optical system.

According to the present invention, there is also provided an image signal processing device for processing an image signal produced by a reading optical system, comprising unsharp signal generating means for sampling image signals S produced when image information on an original is scanned by the reading optical system, according to mask size data selected to correct different MTF characteristics of the image signals depending on the direction in which the image information is scanned, and for averaging the sampled image signals thereby to produce an unsharp signal U, and image signal generating means for generating an image signal S' from the image signals S and the unsharp signal U according to the equation $$S' = S + K \cdot (S - U)$$

where K is a corrective coefficient.

According to the present invention, there is further provided an image signal processing device for processing an image signal produced by a reading optical system, comprising unsharp signal generating means for averaging image signals S produced when image information on an original is scanned by the reading optical system, thereby to produce an unsharp signal U, and image signal generating means for generating an image signal S' from the image signals S and the unsharp signal U according to the equation:

$$S' = S + K(U) \cdot (S - U)$$

where K(U) is a corrective coefficient selected depending on the unsharp signal U to compensate for degradation of MTF characteristics of the image signals, which degradation is caused by the reading optical system.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

Figure 7:
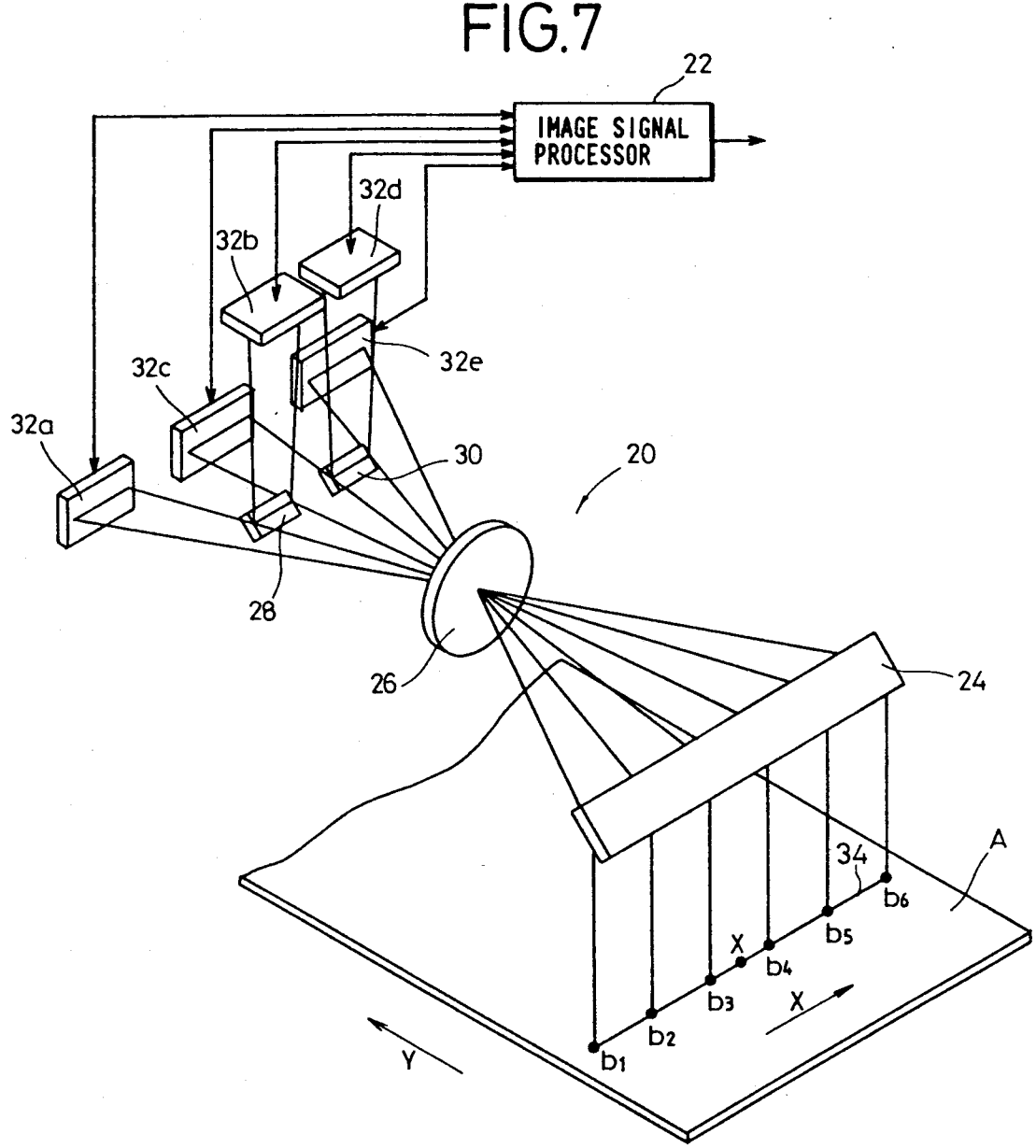
FIG. 7 is a schematic perspective view of an image scanning reading system which incorporates an image signal processing device according to the present invention.

FIG. 7 schematically shows an image scanning reading system which incorporates an image signal processing device according to the present invention. The image signal scanning reading system generally comprises a reading optical system 20 for producing an image signal from image information carried by an original or copy A, and an image signal processor 22 for processing the image signal produced by the reading optical system 20 and correcting MTF characteristics of the image signal thereby to produce a desired image signal. The image signal processor 22 corresponds to the image signal processing device according to the present invention.

The reading optical system 20 has a fully reflecting mirror 24 for fully reflecting light which is reflected from the original A that is being fed in an auxiliary scanning direction indicated by the arrow Y, a lens 26 and a pair of fully reflecting mirrors 28, 30 for guiding the reflected light from the fully reflecting mirror 24, and five line sensors or CCDs 32a through 32e for converting the reflected light guided through the lens 26 and the fully reflecting mirrors 28, 30 into electric signals. Image information on the original A between scanned positions $b_1$, $b_2$, scanned positions $b_3$, $b_4$, and scanned positions $b_5$, $b_6$ along a main scanning line 34 is transmitted through the fully reflecting mirror 24 and the lens 26 and converted into electric signals by the CCDs 32e, 32c, 32a, respectively. Image information on the original A between the scanned positions $b_2$, $b_3$ and the scanned positions $b_4$, $b_5$ along the main scanning line 34 is transmitted through the fully reflecting mirror 24, the lens 26, and the fully reflecting mirrors 30, 28 and converted into electric signals by the CCDs 32d, 32b, respectively.

Figure 8:
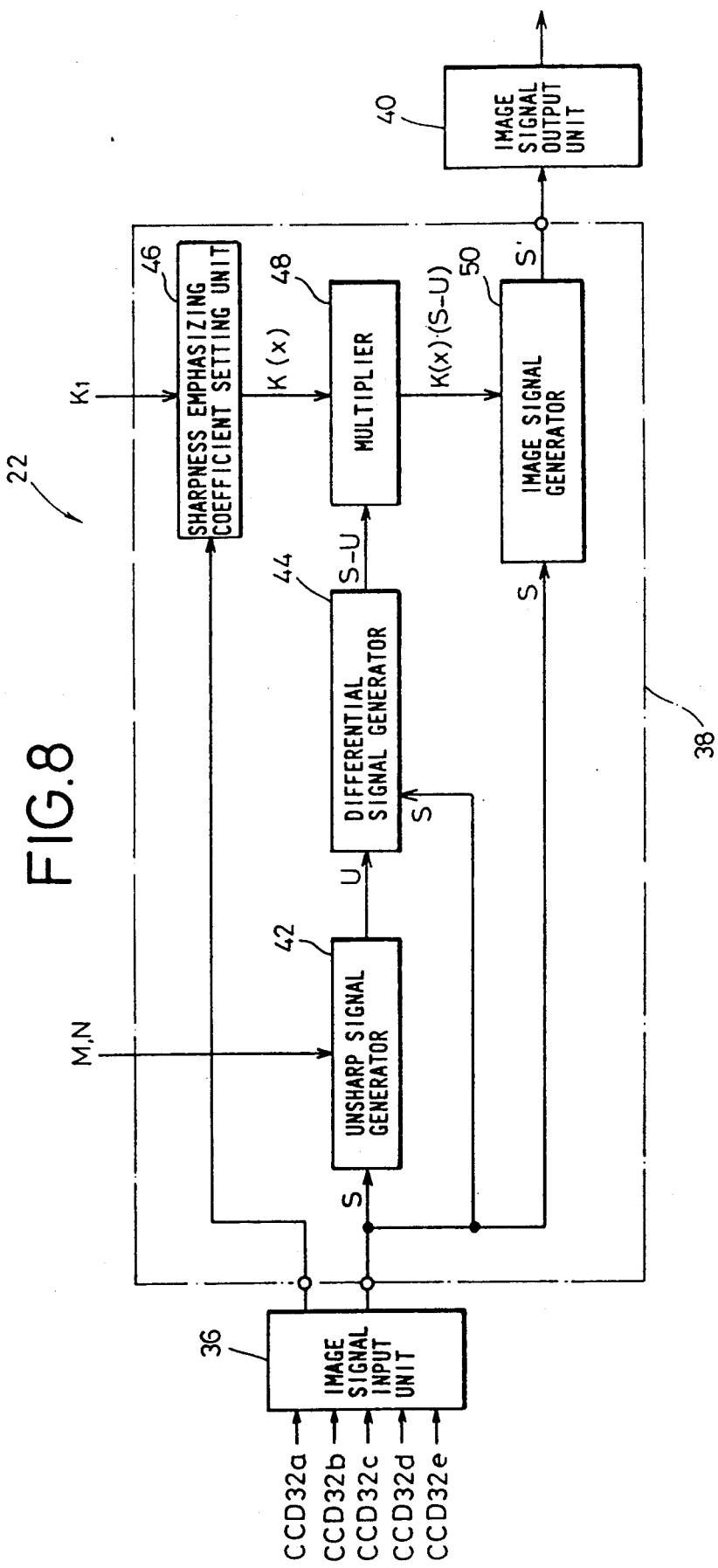
FIG. 8 is a block diagram of an image signal processor according to the present invention, which is incorporated in the image scanning reading system shown in FIG. 7.

As shown in FIG. 8, the image signal processor 22 basically comprises an image signal input unit 36, an image signal correcting unit 38, and an image signal output unit 40. The image signal input unit 36 converts the electric signals which have been photoelectrically converted from the image information by the CCDs 32a through 32e into a digital image signal S at a predetermined sampling pitch, and supplies the image signal S, together with a positional signal representative of a scanned position x on the original A, to the image signal correcting unit 38. The image signal output unit 40 effects various forms of image processing such as gradation conversion, multiplication ratio conversion, sharpness emphasis, halftone-dot conversion, etc. on a corrected image signal S' from the image signal processing unit 38. The image signal S' which has been processed by the image signal output unit 40 is then used to modulate a laser beam, which is applied to an image recording medium such as a photographic film to record and reproduce a corresponding image thereon.

The image signal correcting unit 38 comprises an unsharp signal generator 42, a differential signal generator 44, a sharpness emphasizing coefficient setting unit 46 as a corrective coefficient setting unit, a multiplier 48, and an image signal generator 50. The unsharp signal generator 42 serves to generate an unsharp signal U based on the image signal S from the image signal input unit 36 and mask size data M, N (described later on). The differential signal generator 44 serves to generate a differential signal (S−U) indicative of the difference between the image signal S and the unsharp signal U. The multiplier 48 serves to determine the product of the differential signal (S−U) and a corrective coefficient or sharpness emphasizing coefficient K(x) from the sharpness emphasizing coefficient setting unit 46. The sharpness emphasizing coefficient setting unit 46 establishes a sharpness emphasizing coefficient K(x) depending on the scanned position x on the original A, and supplies the established sharpness emphasizing coefficient K(x) to the multiplier 48. The image signal generator 50 serves to determine the sum of the image signal S and a product signal K(x)·(S−U) from the multiplier 48, thereby producing the image signal S'.

The image scanning reading system is basically constructed as described above. Now, an image signal processing process in the image scanning reading system will be described below.

In FIG. 7, light reflected from the original A and representing image information carried by the original A is reflected by the fully reflecting mirror 24 and applied through the lens 26 to the CCDs 32a, 32c, 32e, and further reflected by the fully reflecting mirrors 28, 30 and applied to the CCDs 32b, 32d. The light detected by the CCDs 32a through 32e is photoelectrically converted into electric signals, which are then converted into a digital image signal S by the image signal input unit 36 shown in FIG. 8. The digital image signal is then supplied to the image signal correcting unit 38.

The image information carried by the original A is divided by the CCDs 32a through 32e into m pixels in the main scanning direction indicated by the arrow X and n pixels in the auxiliary scanning direction indicated by the arrow Y. Each of image signals S corresponding to the respective divided pixels will hereinafter referred to as an image signal $Sij$ ($i=1, \ldots m, j=1, \ldots, n$).

The image signal Sij supplied to the image signal correcting unit 38 is converted into an unsharp signal Uij based on mask size data M, N by the unsharp signal generator 42. The unsharp signal Uij can be generated by extracting M image signals in the main scanning direction X and N image signals in the auxiliary scanning direction Y, from around the image signal Sij, and averaging the extracted image signals according to the following equation, for example:

$$Uij = \sum_{k=i-L}^{i+L} \sum_{l=j-G}^{j+G} Skl/(M \cdot N) \quad (1)$$

$$L = \frac{M-1}{2}$$

$$G = \frac{N-1}{2}$$

The differential signal generator 44 determines the difference between the image signal Sij and the unsharp signal Uij from the unsharp signal generator 42 and supplies a differential signal (Sij−Uij) to the multiplier 48.

The multiplier 48 then determines the product of the sharpness emphasizing coefficient K(x) from the sharpness emphasizing coefficient setting unit 46 and the differential signal (Sij−Uij) from the differential signal generator 44, and supplies a product signal K(x)·(Sij−Uij) to the image signal generator 50. The sharpness emphasizing coefficient K(x) is determined depending on the scanned position x on the original A, and successive sharpness emphasizing coefficients K(x) are supplied to the multiplier 48, depending on the positional signal from the image signal input unit 36.

The image signal generator 50 corrects the image signal Sij from the image signal input unit 36 according to the product signal from the multiplier 48, and produces a corrected image signal S'ij as follows:

$$S'ij = Sij + K(x) \cdot (Sij - Uij) \quad (2)$$

The image signal S'ij thus generated is then supplied to the image output unit 40 and processed thereby for gradation conversion, multiplication ratio conversion, sharpness emphasis, halftone-dot conversion, etc. The processed image signal is thereafter recorded as a reproduced image on a recording medium such as a photographic film or the like.

Figure 9:
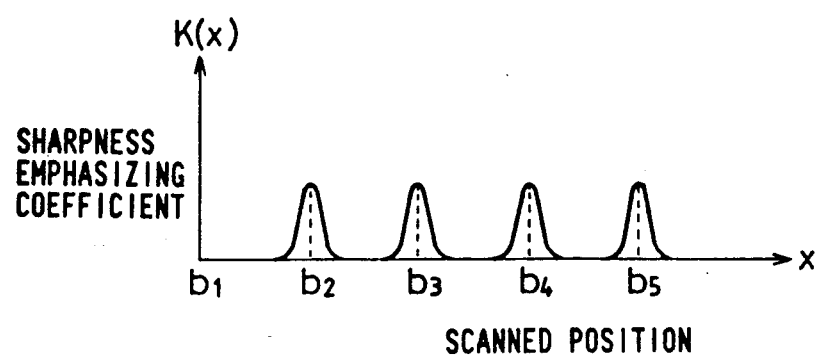
FIG. 9 is a diagram illustrating a sharpness emphasizing coefficient which is preset by a sharpness emphasizing coefficient setting unit in the image signal processor shown in FIG. 8.

In this embodiment, the sharpness emphasizing coefficient K(x) is established depending on the scanned position x on the original A by the sharpness emphasizing coefficient setting unit 46 as shown in FIG. 9, for compensating for variations or irregularities of the MTF characteristics in the scanned position x at areas where the CCDs 32a through 32e are optically joined. More specifically, the sharpness emphasizing coefficient K(x) is increased in the vicinity of the scanned positions $b_2$ through $b_5$ which correspond to the areas where the CCDs 32a through 32e are optically joined. In this manner, as can be understood from the equation (2), the image signal S' is emphasized according to the sharpness emphasizing coefficient K(x). Consequently, the variations or irregularities of the MTF characteristics in the vicinity of the scanned positions $b_2$ through $b_5$ are compensated for, with the result that the MTF characteristics are rendered uniform with respect to the scanned position x.

Figure 4A:
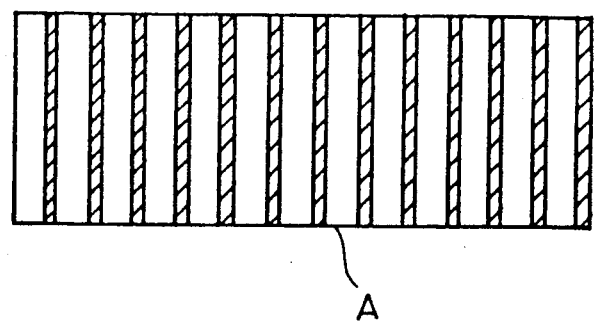
FIGS. 4(a) through 4(d) and 5(a) through 5(d) are diagrams illustrative of images reproduced when image information on originals are scanned with the conventional image scanning reading system shown in FIG. 1.
Figure 4B:
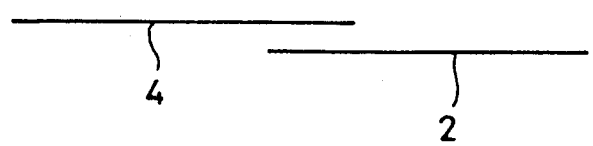
Figure 4C:
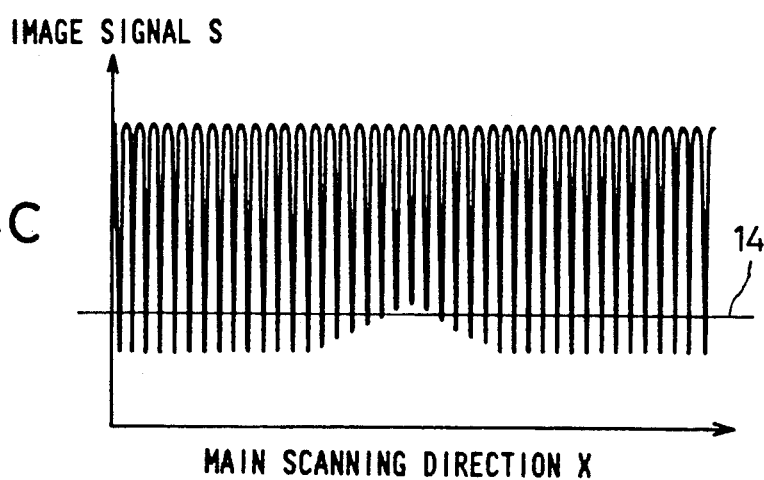
Figure 4D:
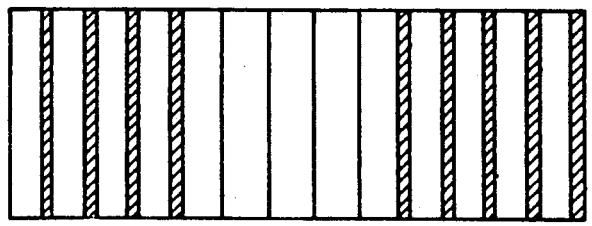
Figure 5A:
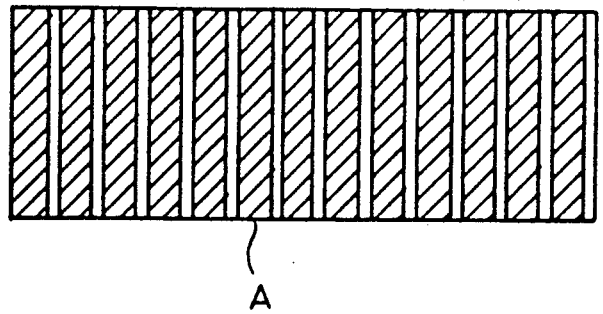
Figure 5B:
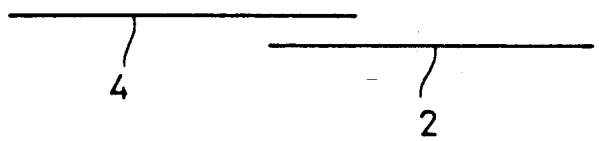
Figure 5C:
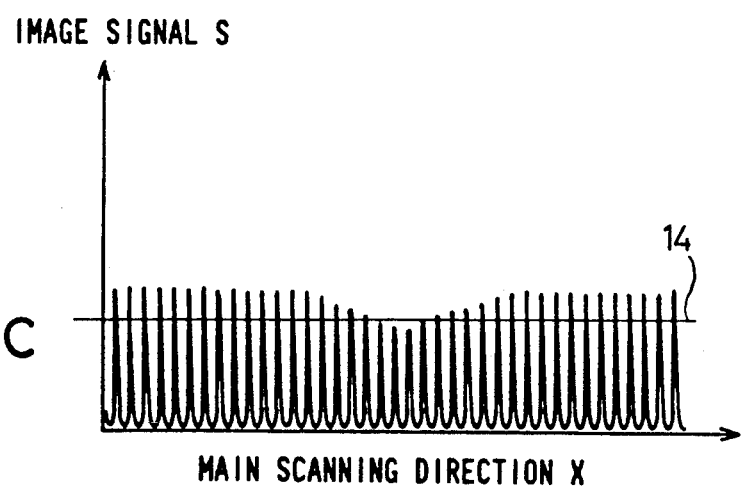
Figure 5D:
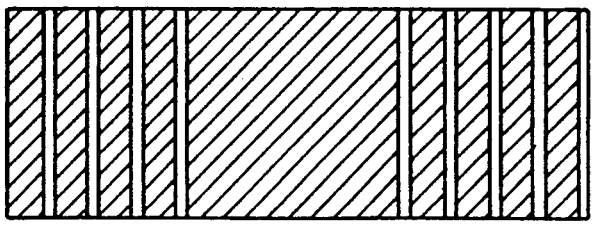

When a digitized image as shown in FIG. 4(a) or 5(a), for example, is reproduced, the reproduced image does not suffer density irregularities which would otherwise be caused by irregular MTF characteristics. When a continuous-tone image is converted into a halftone-dot image, since the halftone dot area ratio is free of variations, the reproduced halftone-dot image does not have density irregularities and has uniform sharpness. Since the sharpness emphasizing coefficient K(x) is set depending on the scanned position x, not only variations or irregularities of the MTF characteristics in the areas where the CCDs 32a through 32e are optically joined are compensated for, but also variations or irregularities of the MTF characteristics due to the individual photoelectric transducers of the CCDs 32a through 32e or the angle of view of the lens 26 are compensated for.

As descried above, the MTF characteristics depending on the scanned position x are corrected because the sharpness emphasizing coefficient K(x) is adjusted depending on the scanned position x. Moreover, variations of the MTF characteristics depending on the scanning direction can also be compensated for when the mask size data M, N are adjusted.

Figure 6:
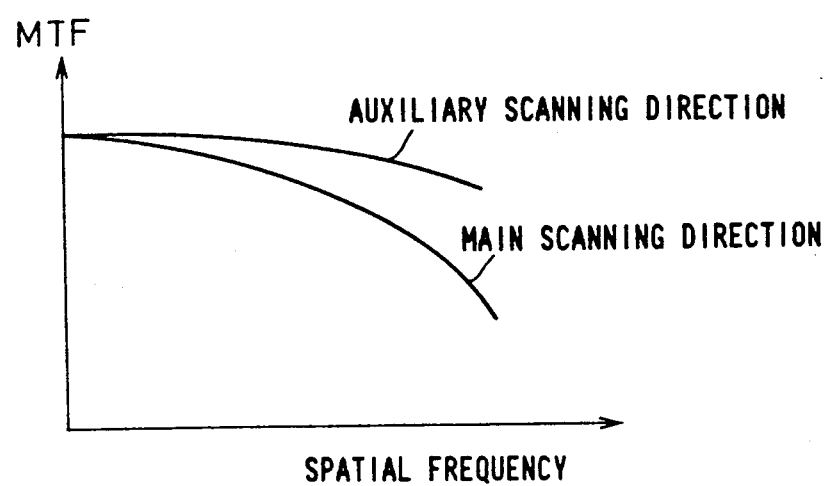
FIG. 6 is a diagram showing the relationship between spatial frequencies and MTF characteristics of the conventional image scanning reading system shown in FIG. 1.
Figure 10:
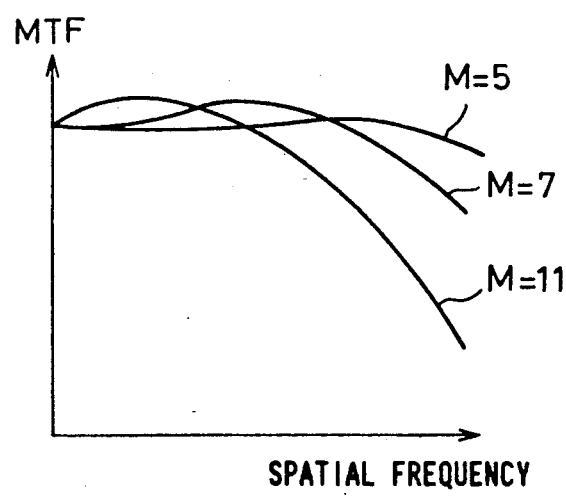
FIG. 10 is a diagram showing the relationship between spatial frequencies and MTF characteristics with respect to mask size data.

As shown in FIG. 10, the MTF characteristics vary with respect to the mask size data M in the main scanning direction X when the unsharp signal Uij is generated. If the mask size data M, N are selected to be M=7 and N=3, then the variations of the MTF characteristics between the main and auxiliary scanning directions X, Y, as shown in FIG. 6, are eliminated.

Figure 11:
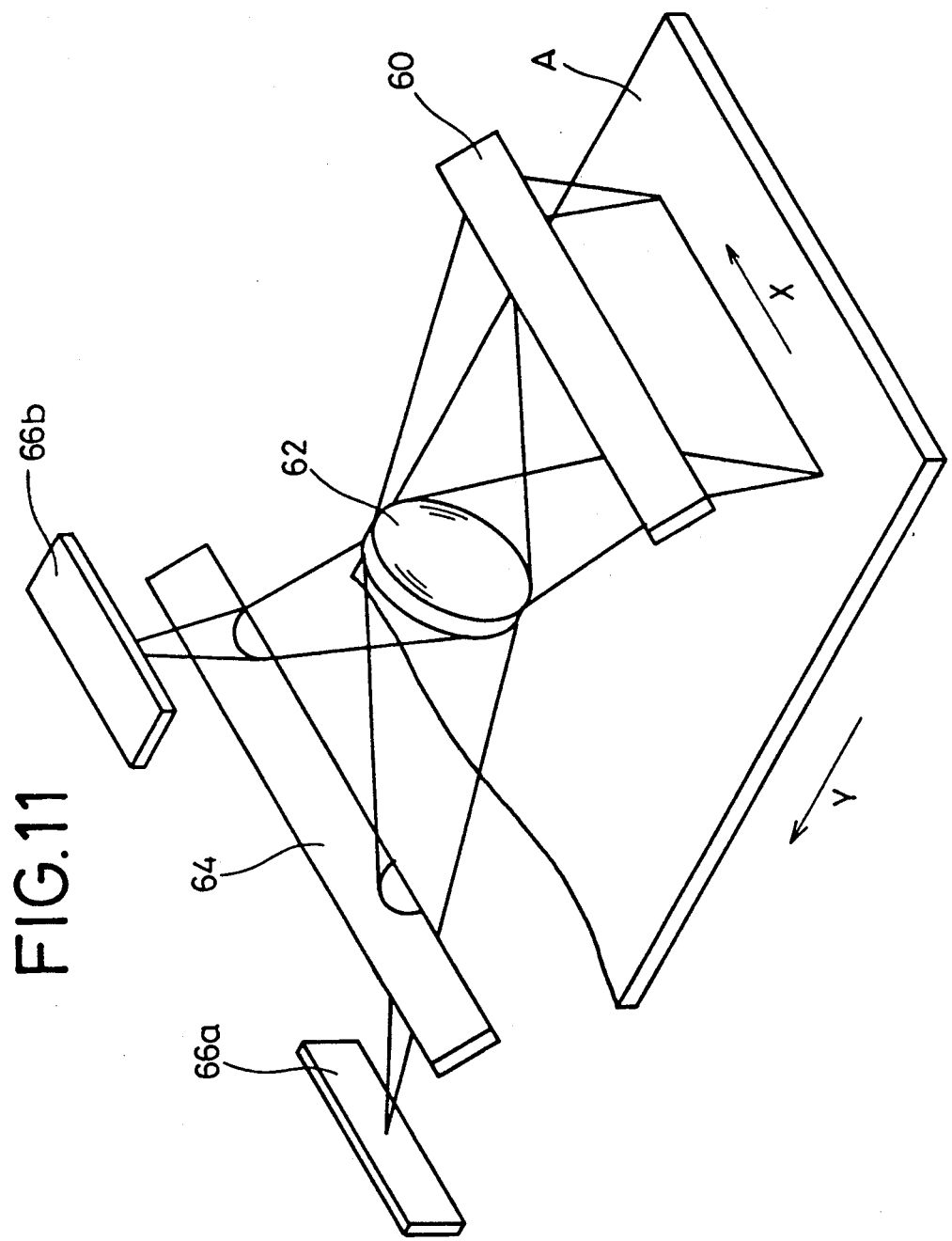
FIG. 11 is a schematic perspective view of an image scanning reading system according to another embodiment of the present invention, which incorporates the principles of the present invention.
Figure 12:
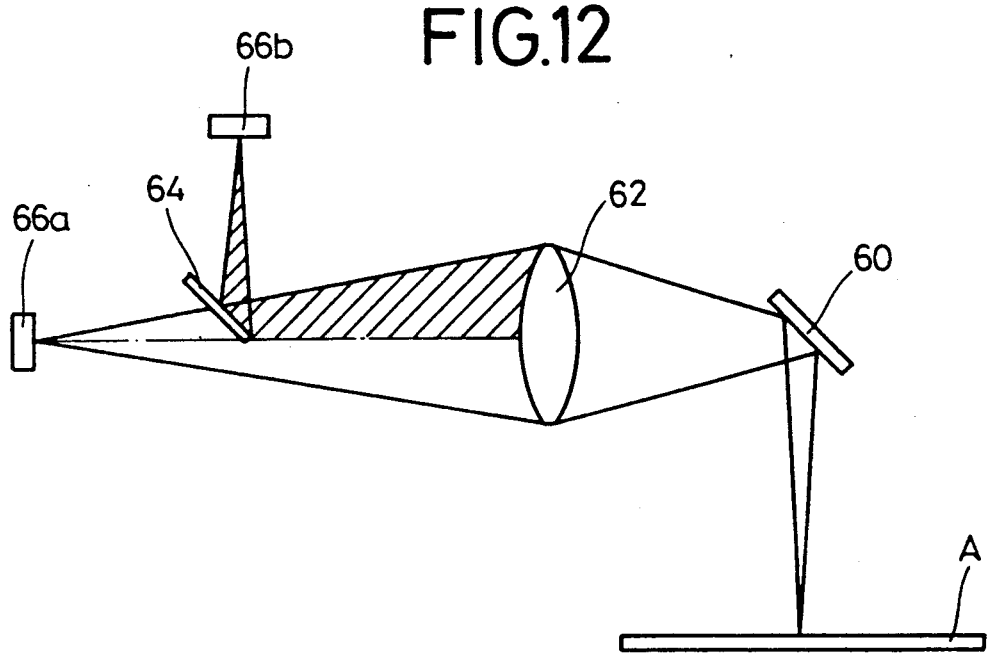
FIG. 12 is a schematic side elevational view of the image scanning reading system shown in FIG. 11.

FIGS. 11 and 12 show an image scanning reading system according to another embodiment of the present invention, which incorporates the principles of the present invention. In the image scanning reading system shown in FIGS. 11 and 12, light reflected from the original A is guided to CCDs 66a, 66b by a fully reflecting mirror 60, a lens 62, and a fully reflecting mirror 64. The fully reflecting mirror 64 is of an elongate shape in the main scanning direction indicated by the arrow X so as to cover all positions on the original A which are scanned by the CCDs 66a, 66b in the main scanning direction X. The light reflected from the original A and transmitted through the fully reflecting mirror 60 and the lens 62 is divided by the fully reflecting mirrors 64 into two beams of substantially half intensity along the auxiliary scanning direction Y, which beams are then applied to the CCDs 66a, 66b, respectively.

In the arrangement shown in FIGS. 11 and 12, the MTF characteristics do not suffer from variations or irregularities in the vicinity of the area where the CCDs 66a, 66b are optically joined. However, since the light reflected from the original A is partly vignetted by the fully reflecting mirror 64, the MTF characteristics are nevertheless variable depending on the scanning direction. The MTF characteristics can be uniformized through appropriate selection of the mask size data M, N in order to compensate for variations of the MTF characteristics depending on the scanning direction. As a result, the image scanning reading system can produce an image signal based on which a high-quality image can be reproduced.

Figure 13:
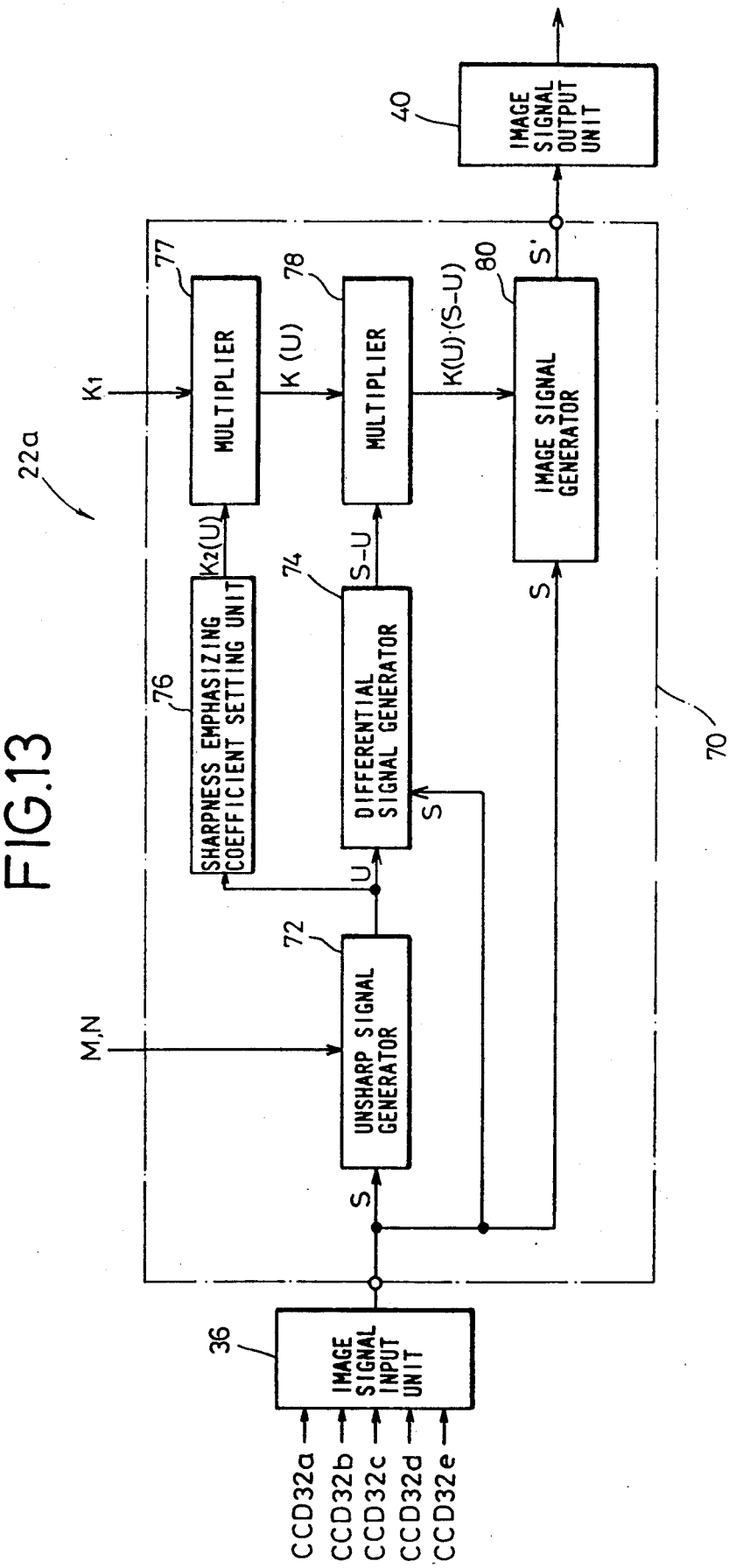
FIG. 13 is a block diagram of an image signal processor according to another embodiment of the present invention, which is incorporated in an image scanning reading system.

FIG. 13 shows an image signal processor according to another embodiment of the present invention, which is incorporated in an image scanning reading system. The image signal processor, generally denoted at 22a, includes an image signal correcting unit 70 which comprises an unsharp signal generator 72, a differential signal generator 74, a sharpness emphasizing coefficient setting unit 76 as a corrective coefficient setting unit, a pair of multipliers 77, 78, and an image signal generator 80. The unsharp signal generator 72 serves to generate an unsharp signal U based on an image signal S from the image signal input unit 36 and mask size data M, N. The differential signal generator 74 serves to generate a differential signal (S−U) indicative of the difference between the image signal S and the unsharp signal U. The multiplier 77 serves to determine a corrective coefficient or sharpness emphasizing coefficient K(U) which is the product of a sharpness emphasizing coefficient $K_2(U)$ from the sharpness emphasizing coefficient setting unit 76 and a sharpness emphasizing coefficient $K_1$. The sharpness emphasizing coefficient setting unit 76 establishes a sharpness emphasizing coefficient $K_2(U)$ depending on the unsharp signal U, and supplies the established sharpness emphasizing coefficient $K_2(U)$ to the multiplier 77. The multiplier 77 is also supplied with a sharpness emphasizing coefficient $K_1$ which is a constant selected by the operator. The multiplier 78 determines the product of the sharpness emphasizing coefficient K(U) from the multiplier 77 and the differential signal (S−U) from the differential signal generator 74. The image signal generator 80 serves to determine the sum of the image signal S and a product signal K(U)·(S−U) from the multiplier 78, thereby producing an image signal S'.

An image signal processing process in the image scanning reading system shown in FIG. 13 will be described below.

An image signal Sij supplied from the image signal input unit 36 to the image signal correcting unit 70 is converted into an unsharp signal Uij based on mask size data M, N by the unsharp signal generator 72.

The differential signal generator 74 determines the difference between the image signal Sij and the unsharp signal Uij from the unsharp signal generator 72 and supplies a differential signal (Sij−Uij) to the multiplier 78.

Figure 14:
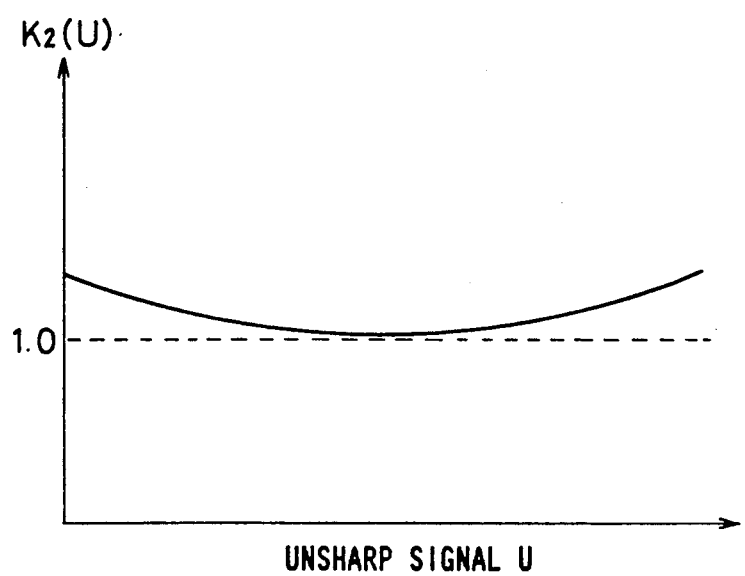
FIG. 14 is a diagram illustrating a sharpness emphasizing coefficient which is preset by a sharpness emphasizing coefficient setting unit in the image signal processor shown in FIG. 13.

The sharpness emphasizing coefficient setting unit 76 stores a data table, as shown in FIG. 14, which contains sharpness emphasizing coefficients $K_2(U)$ that gradually decrease down to 1.0 and then increase again as the level of the unsharp signal U increases. The sharpness emphasizing coefficient setting unit 76 selects a sharpness emphasizing coefficient $r_2(Uij)$ depending on the unsharp signal Uij from the unsharp signal generator $72_2$ and supplies the selected sharpness emphasizing coefficient $K_2(Uij)$ to the multiplier 77.

The multiplier 77 then determines the product of the sharpness emphasizing coefficient $K_2(U)$ from the sharpness emphasizing coefficient setting unit 76 and the sharpness emphasizing coefficient $K_1$ or constant selected by the operator, and supplies a sharpness emphasizing coefficient K(Uij) indicative of the product to the multiplier 78. The multiplier 78 then determines the product of the sharpness emphasizing coefficient K(Uij) from the multiplier 77 and the differential signal (Sij−Uij) from the differential signal generator 74, and supplies a product signal K(U)·(Sij−Uij) to the image signal generator 80.

The image signal generator 80 corrects the image signal Sij from the image signal input unit 36 according to the product signal from the multiplier 78, and produces a corrected image signal S'ij as follows:

$$S'ij = Sij + K(Uij)\cdot(Sij\cdot Uij) \quad (3)$$

The image signal S'ij thus generated is then supplied to the image output unit 70 and processed thereby for gradation conversion, multiplication ratio conversion, sharpness emphasis, halftone-dot conversion, etc. The processed image signal is thereafter recorded as a reproduced image on a recording medium such as a photographic film or the like.

Figure 1:
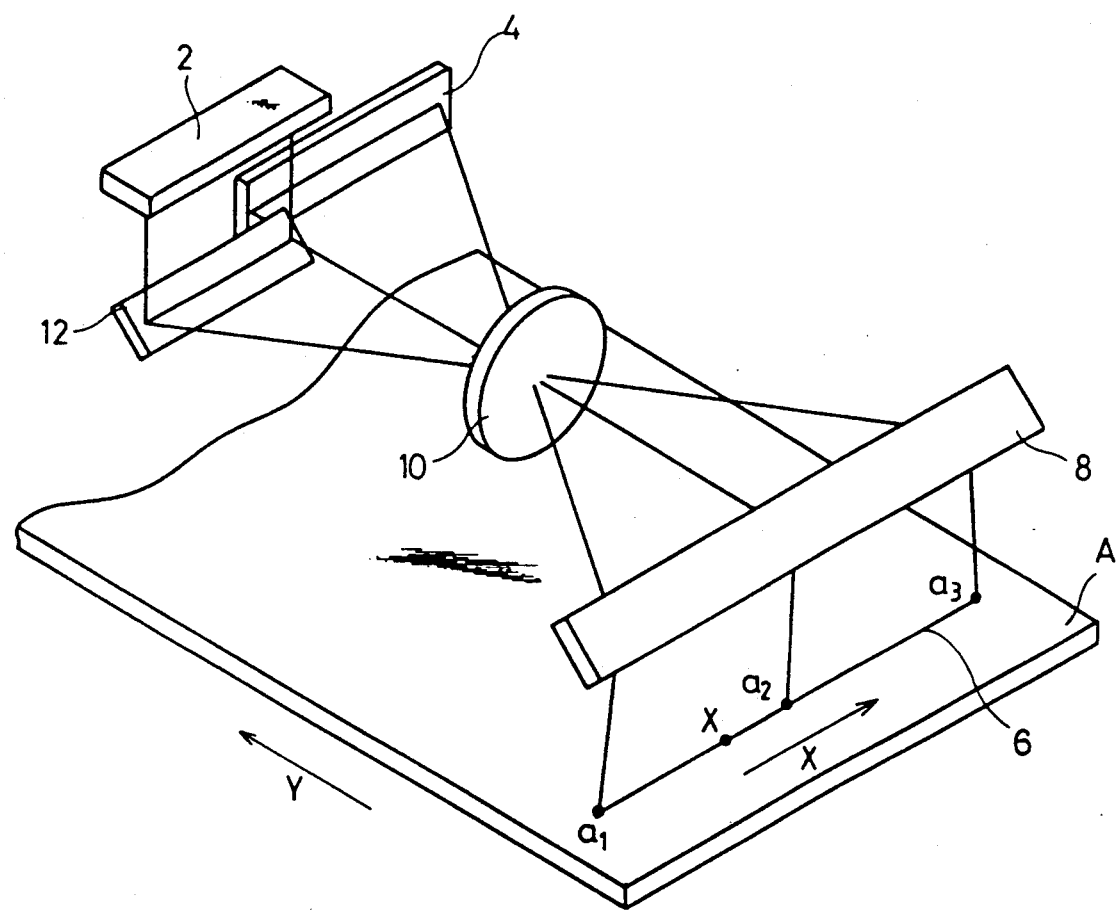
FIG. 1 is a schematic perspective view of a conventional image scanning reading system.
Figure 2:
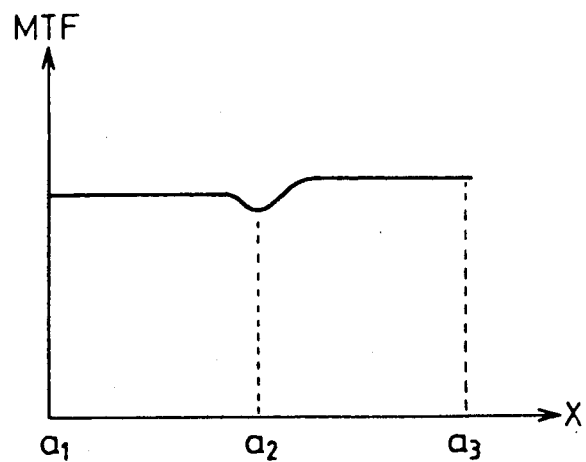
FIG. 2 is a diagram showing the relationship between scanned positions and MTF characteristics of the conventional image scanning reading system shown in FIG. 1.
Figure 3:
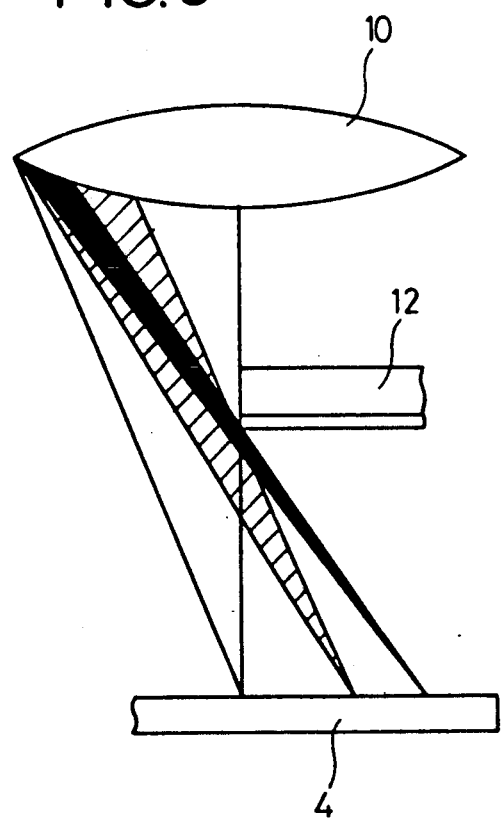
FIG. 3 is a schematic view illustrative of the manner in which the MTF characteristics of the conventional image scanning reading system shown in FIG. 1 are degraded.

In this embodiment, the sharpness emphasizing coefficient $K_2(U)$ is established depending on the unsharp signal U as shown in FIG. 14, for compensating for variations or irregularities of the MTF characteristics due to the reading optical system 20 (FIG. 2).

Figure 15A:
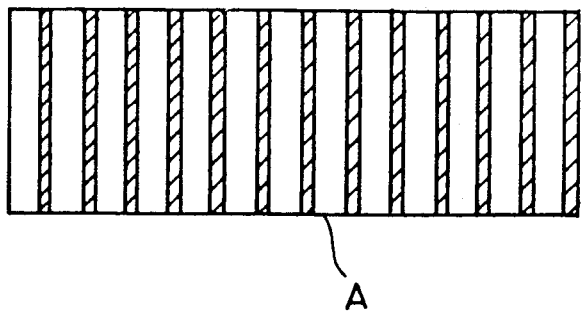
FIGS. 15(a) through 15(c) and 16(a) through 16(c) are diagrams illustrative of image signals and unsharp signals which are produced when image information on originals is scanned with the image scanning reading system shown in FIG. 7.
Figure 15B:
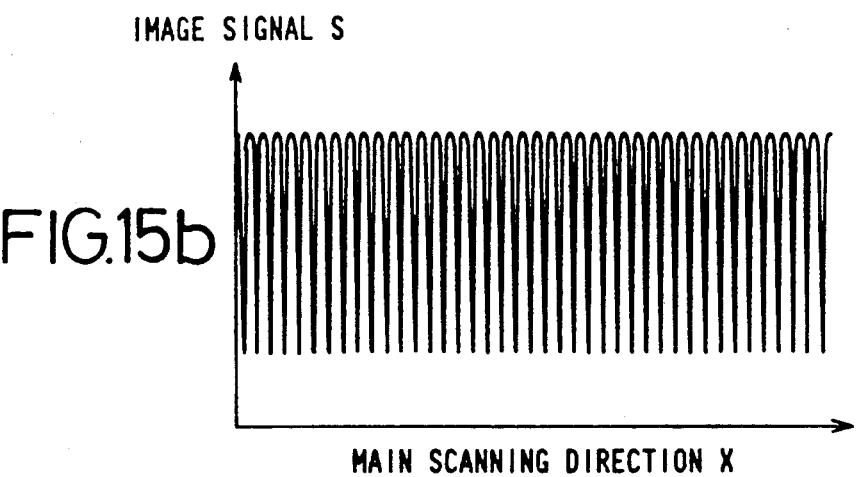
Figure 15C:
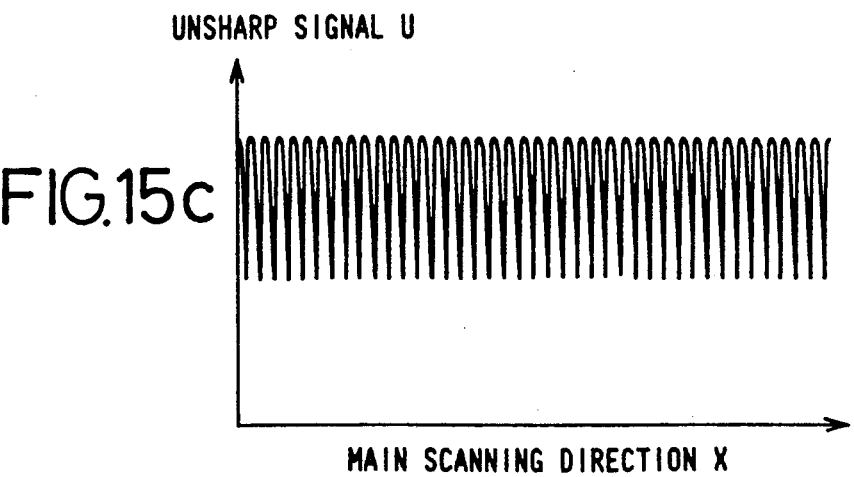
Figure 16A:
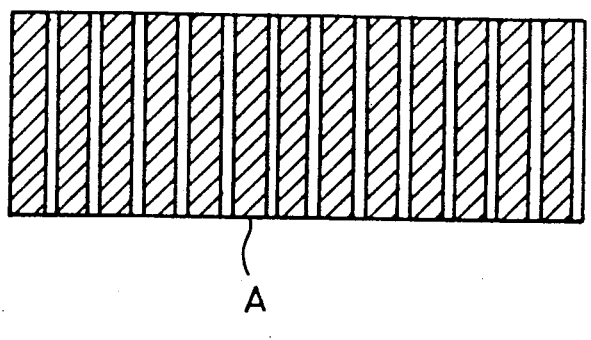
Figure 16B:
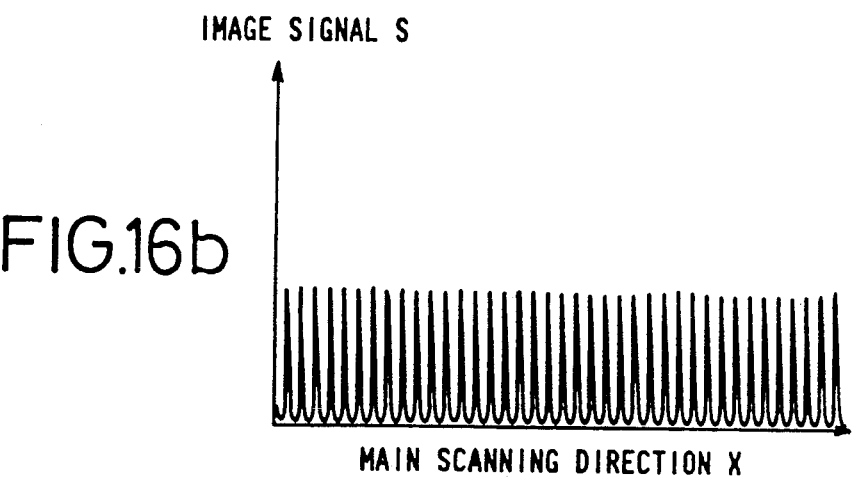
Figure 16C:
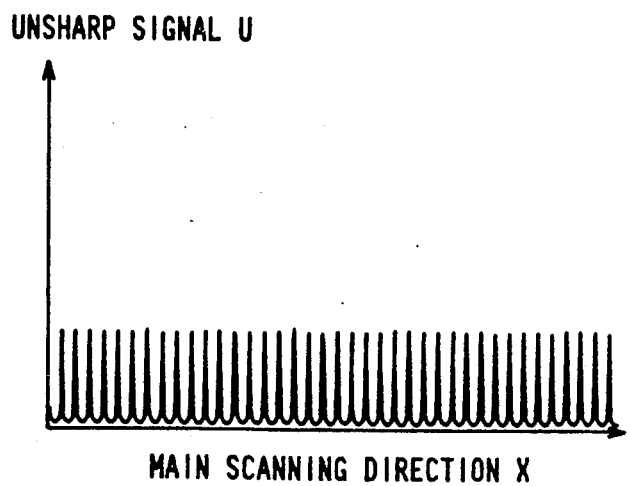

The MTF characteristics of the image signal S with respect to the spatial frequency of the digitized image of the original A are degraded because of the reading optical system 20 as the spatial frequency increases as shown in FIG. 10. When a striped highlight image as shown in FIG. 15(a) is read, an image signal S is produced as shown in FIG. 15(b), and an unsharp signal U obtained from the image signal S has a high level as shown in FIG. 15(c). The high-light image which has a higher duty ratio contains more high spatial frequency components than an image whose duty ratio is 50%. When a striped shadow image having a lower duty ratio as shown in FIG. 16(a) is read, an image signal S is produced as shown in FIG. 16(b), and an unsharp signal U obtained from the image signal S has a level lower than the level of the unsharp signal produced when the highlight image is read, as shown in FIG. 16(c). The shadow image which a lower duty ratio also contains more high spatial frequency components than the image whose duty ratio is 50%.

It follows from the above analysis that when the unsharp signal U is of a higher or lower level, the spatial frequency of the original A is higher, and when the unsharp signal U is of an intermediate level between the higher and lower levels, the spatial frequency of the original A is lower. Therefore, if the sharpness emphasizing coefficient $K_2(U)$ is increased in regions where the unsharp signal U is higher and lower in level, then the degradation of the MTF characteristics can appropriately be corrected irrespective of the spatial frequency (see FIG. 14).

In the above embodiment, the sharpness emphasizing coefficient $K_2(U)$ is multiplied by the sharpness emphasizing coefficient $K_1$ in the multiplier 77 to produce the sharpness emphasizing coefficient $K(U)$, and the image signal is processed using the sharpness emphasizing coefficient $K(U)$. The sharpness emphasizing coefficient $K_1$ is a constant selected by the operator. The operator can effect a desired sharpness emphasizing process simply by selecting the sharpness emphasizing coefficient $K_1$, without having regard to any MTF characteristics whatsoever in the image scanning reading system.

With the present invention, as described above, the corrective coefficient is selected depending on variations or irregularities of the MTF characteristics depending on the scanned position x, and the image signal is corrected using the selected corrective coefficient, so that an image signal having uniform MTF characteristics can be produced. When an image is reproduced based on the corrected image signal, the reproduced image is free of density irregularities and is of high quality with uniform sharpness.

Furthermore, the mask size data used to correct the image signal may be selected depending on the MTF characteristics, so that an image signal having uniform MTF characteristics which do not depend on the scanning direction can be obtained. Based on the produced image signal, a high-quality image free of density irregularities and having uniform sharpness can be reproduced.

In addition, the corrective coefficient is selected depending on the unsharp signal which is produced when image signals are averaged, and the image signal is corrected using the corrective coefficient thus selected. There can thus be generated an image signal with the degradation of its MTF characteristics being corrected, based on the information of spatial frequencies contained in the unsharp signal. When an image is reproduced base on the corrected image signal, the reproduced image is free of density irregularities and is of high quality with uniform sharpness.

The image signal processing device according to the present invention is highly simple in structure since variations or irregularities of MTF characteristics can be compensated for simply when a corrective coefficient is selected depending on the MTF characteristics due to the reading optical system.

Although certain preferred embodiments have been shown and described it should be understood that many changes and modifications may be made therein without departing from the scope of the appended claims.

What is claimed is:

1. An image signal processing device for processing an image signal produced by a reading optical system, comprising:
   unsharp signal generating means for averaging image signals S produced when image information on an original is scanned by the reading optical system, thereby to produce an unsharp signal U; and
   image signal generating means for generating an image signal S' from the image signals S and the unsharp signal U according to the equation:

$$S' = S + K(x) \cdot (S - U)$$

where $K(x)$ is a corrective coefficient selected to compensate for variations of MTF characteristics of the image signals, which variations are caused with respect to scanned positions x on the original by the reading optical system.

2. An image signal processing device for processing an image signal produced by a reading optical system, comprising:
   unsharp signal generating means for sampling image signals S produced when image information on an original is scanned by the reading optical system, according to mask size data selected to correct different MTF characteristics of the image signals depending on the direction in which the image information is scanned, and for averaging the sampled image signals thereby to produce an unsharp signal U; and
   image signal generating means for generating an image signal S' from the image signals S and the unsharp signal U according to the equation:

$$S' = S + K \cdot (S - U)$$

where K is a corrective coefficient.

3. An image signal processing device for processing an image signal produced by a reading optical system, comprising:
   unsharp signal generating means for averaging image signals S produced when image information on an original is scanned by the reading optical system, thereby to produce an unsharp signal U; and
   image signal generating means for generating an image signal S' from the image signals S and the unsharp signal U according to the equation:

$$S' = S + K(U) \cdot (S \cdot U)$$

where $K(U)$ is a corrective coefficient selected depending on the unsharp signal U to compensate for degradation of MTF characteristics of the image signals, which degradation is cause by the reading optical system.

* * * * *